US009396414B2

(12) United States Patent
Ito et al.

(10) Patent No.: US 9,396,414 B2
(45) Date of Patent: Jul. 19, 2016

(54) OBJECT IDENTIFICATION SYSTEM AND PROGRAM

(71) Applicant: FUJI XEROX CO., LTD., Minato-ku, Tokyo (JP)

(72) Inventors: Kensuke Ito, Yokohama (JP); Tetsuya Kimura, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 61 days.

(21) Appl. No.: 14/083,642

(22) Filed: Nov. 19, 2013

(65) Prior Publication Data

US 2014/0079326 A1   Mar. 20, 2014

Related U.S. Application Data

(63) Continuation of application No. PCT/JP2012/050109, filed on Jan. 5, 2012.

(30) Foreign Application Priority Data

Jul. 21, 2011   (JP) ................................. 2011-159678

(51) Int. Cl.
G06K 9/62   (2006.01)
G06F 17/00   (2006.01)
G06F 7/00   (2006.01)
G06K 9/00   (2006.01)
G06K 9/68   (2006.01)

(52) U.S. Cl.
CPC  *G06K 9/627* (2013.01); *G06K 9/00* (2013.01); *G06K 9/00577* (2013.01); *G06K 9/6807* (2013.01); *G06K 2209/19* (2013.01)

(58) Field of Classification Search
None
See application file for complete search history.

(56) References Cited

U.S. PATENT DOCUMENTS

2009/0063431 A1*   3/2009   Erol et al. ........................... 707/3
2009/0110295 A1    4/2009   Ogaki et al.
2014/0140416 A1*   5/2014   Yamazaki et al. ........ 375/240.25

FOREIGN PATENT DOCUMENTS

JP   7-029003 A    1/1995
JP   7-254066 A    10/1995
JP   2004-085212 A   3/2004

(Continued)

OTHER PUBLICATIONS

International Preliminary Report on Patentability issued by the International Bureau in PCT application No. PCT/JP2012/050109 dated Jan. 23, 2014.

(Continued)

*Primary Examiner* — Randolph I Chu
(74) *Attorney, Agent, or Firm* — Sughrue Mion, PLLC

(57) ABSTRACT

An object identification system 1 acquires a captured image of each of objects respectively having peculiar patterns on surfaces thereof, images being formed on the surfaces, classifies, for each of objects, the object into any one of classifications according to features in the captured image acquired concerning the object, and registers, for each of the objects, identification information of the object and a classification of the object in association with one another. The object identification system 1 acquires candidates of classifications of one target object among objects on the basis of a classification result based on a target object captured image of the target object, acquires pattern images registered in association with the acquired classifications, and specifies, as identification information of the target object, identification information associated with a pattern image matching the target object captured image among the acquired pattern images.

7 Claims, 14 Drawing Sheets

(56) References Cited

FOREIGN PATENT DOCUMENTS

| | | | |
|---|---|---|---|
| JP | 2005-038389 A | 2/2005 |
| WO | 2010072745 A1 | 7/2010 |

OTHER PUBLICATIONS

Communication dated Apr. 17, 2015, issued by the European Patent Office in counterpart Application No. 12814525.7.

* cited by examiner 1　　　2　　…　　N

FIG.5
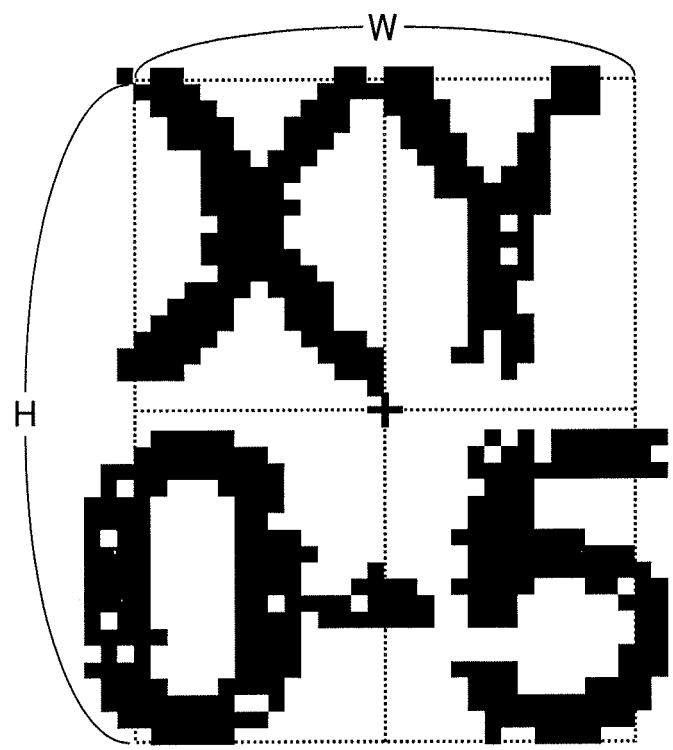
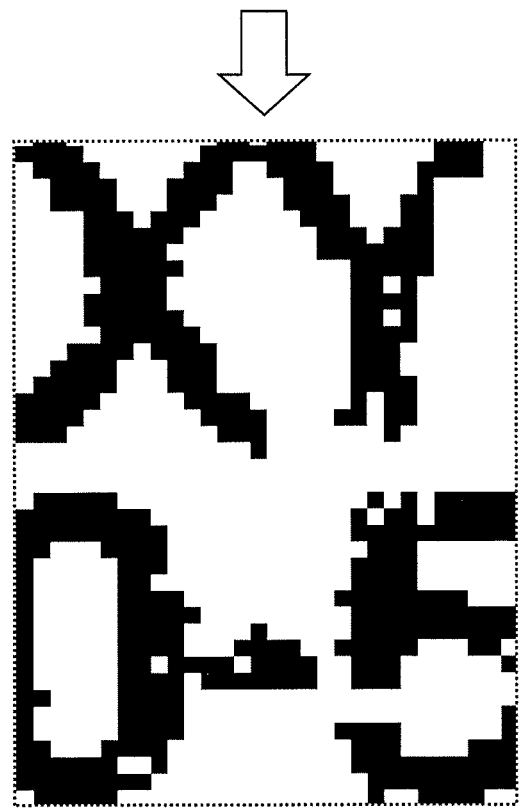

FIG.9

| OBJECT CLASSIFICATION INFORMATION | CLASSIFICATION INFORMATION | | SURFACE PATTERN INFORMATION |
|---|---|---|---|
| | CLASS A | CLASS B | |
| L1-1-1-110101 | G15 | g3 | P0001 |
| L1-2-1-110101 | G22 | g13 | P0002 |

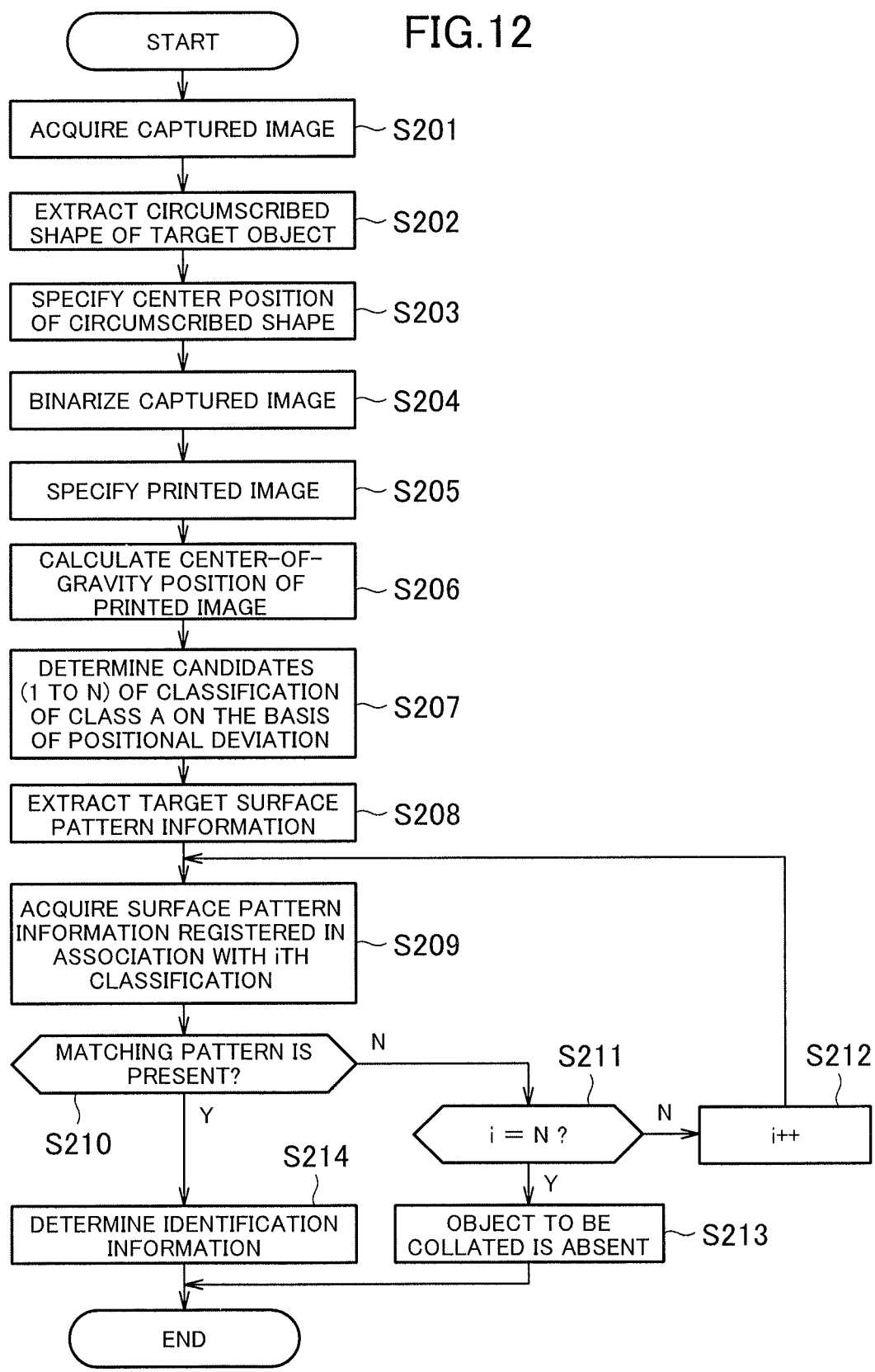

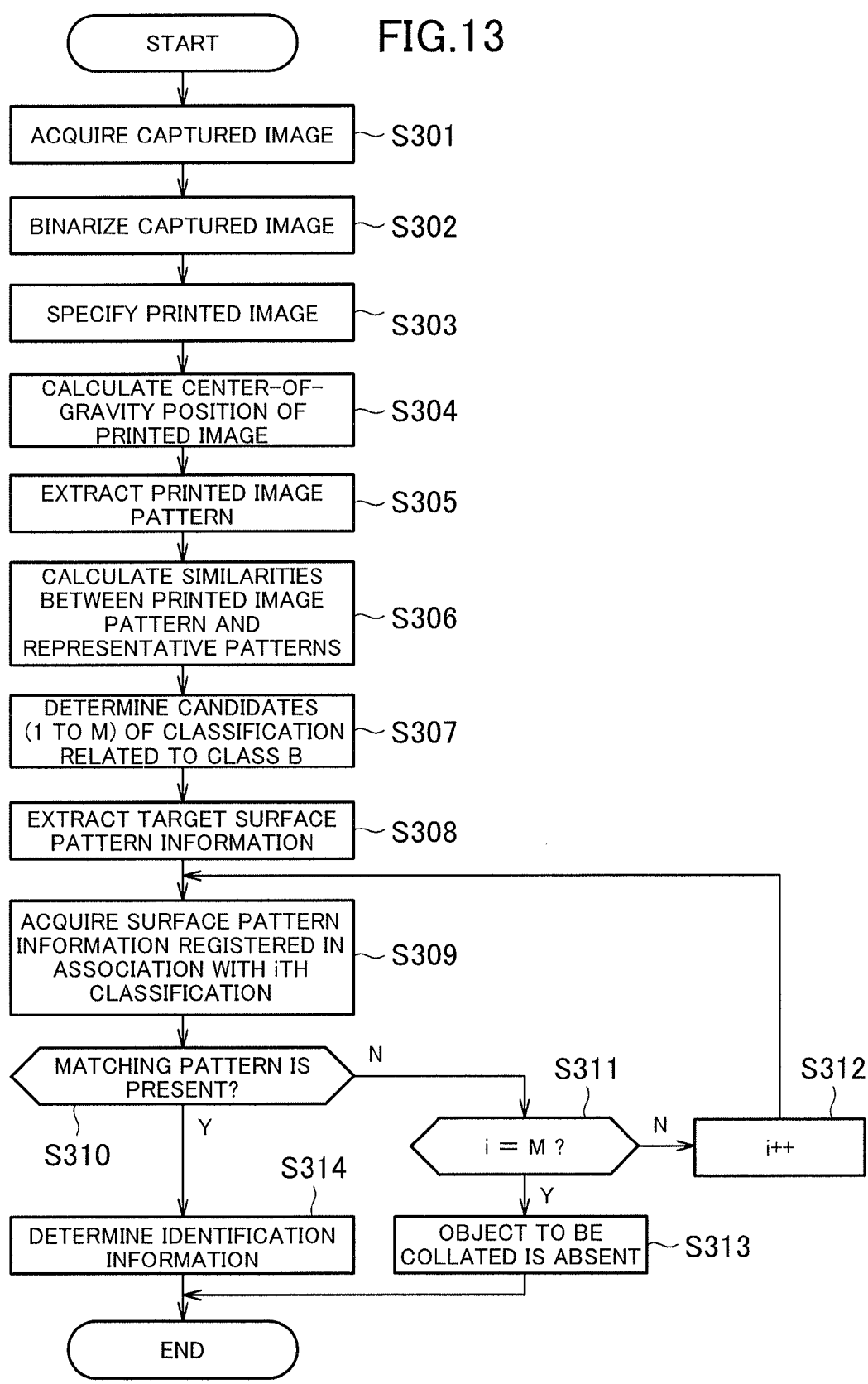

OBJECT IDENTIFICATION SYSTEM AND PROGRAM

CROSS-REFERENCE TO RELATED APPLICATIONS

The present application is a Bypass Continuation of International Application No. PCT/JP2012/050109 filed Jan. 5, 2012, claiming priority from Japanese application JP 2011-159678 filed on Jul. 21, 2011, the contents of all of which are incorporated herein by reference in their entirety.

BACKGROUND

Technical Field

The present invention relates to an object identification system, a registration apparatus, a collation apparatus and a non-transitory computer readable medium.

SUMMARY

According to an aspect of the invention, there is provided an object identification system including acquiring unit that acquires a captured image of each of a plurality of objects respectively having peculiar patterns on surfaces thereof, predetermined images being formed on the surfaces; classifying unit that classifies, for each of the plurality of objects, the object into any one of a plurality of classifications according to a deviation of a position where the predetermined image is formed with respect to a reference position of the object or a pattern of noise included in the predetermined image formed on the object in the captured image acquired by the acquiring unit concerning the object; registering unit that registers, for each of the plurality of objects, identification information of the object, a pattern image indicating the pattern on the surface of the object, and a classification of the object in association with one another; classification acquiring unit that acquires candidates of classifications of a target object, which is one of the plurality of objects, on the basis of a result obtained by the classifying unit classifying the target object on the basis of a target object captured image obtained by capturing an image of the target object; pattern-image acquiring unit that acquires pattern images registered by the registering unit in association with the classifications acquired by the classification acquiring unit; and specifying unit that specifies, as identification information of the target object, identification information associated with a pattern image matching the target object captured image among the pattern images acquired by the pattern-image acquiring unit.

BRIEF DESCRIPTION OF THE DRAWINGS

An exemplary embodiment of the present invention will be described in detail based on the following figures, wherein:

FIG. 5 is a diagram for explaining a specific example of a binarized printed image pattern;

FIG. 9 is a diagram showing an example of a pattern information table;

FIG. 12 is an example of a flowchart of collation processing;

FIG. 13 is an example of a flowchart of collation processing;

DETAILED DESCRIPTION

An exemplary embodiment for carrying out the invention (hereinafter referred to as exemplary embodiment) is explained below according to the drawings.

Figure 1:
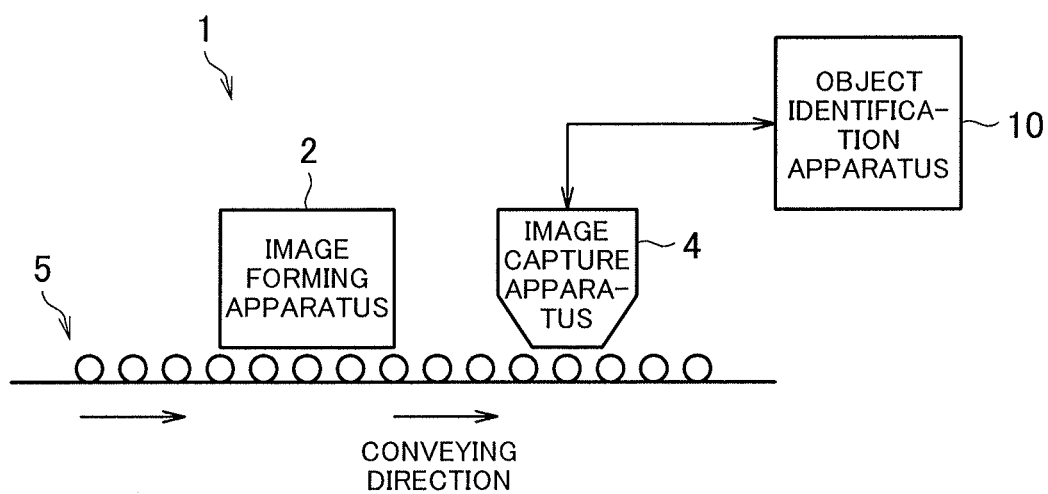
FIG. 1 is a system configuration diagram of an object identification system according to an embodiment.

In FIG. 1, a system configuration diagram of an object identification system 1 according to this exemplary embodiment is shown. As shown in FIG. 1, the object identification system 1 includes an image forming apparatus 2, an image capture apparatus 4, and an object identification apparatus 10. The image capture apparatus 4 and the object identification apparatus 10 are connected to be capable of performing data communication.

The image forming apparatus 2 is provided on, for example, a manufacturing line 5 for objects. The image forming apparatus 2 forms a predetermined image (e.g., a character image) on the surface of an object flowing through the manufacturing line 5. In an example explained in this exemplary embodiment, the object is a circular tablet on the surface of which a predetermined character is printed. Note that the image forming apparatus 2 may form an image on the surface of the tablet through engraving or may perform printing (gravure printing, etc) using edible ink. In the following explanation, an image printed on the surface of the tablet is referred to as printed image.

The image capture apparatus 4 is an apparatus that captures an image of the object (the tablet) subjected to the image formation on the surface thereof by the image forming apparatus 2. The image capture apparatus 4 may be provided on the manufacturing line 5 in the same manner as the image forming apparatus 2. The image capture apparatus 4 captures an image at predetermined resolution (e.g., 600 dpi) and outputs the captured image to the object identification apparatus 10.

The object identification apparatus 10 is a computer that acquires captured images of objects (tablets) from the image capture apparatus 4, registers identification information and surface pattern information of the objects (the tablets) on the basic of the acquired captured images, and performs processing for collating surface pattern information of an identification target object (tablet) and the registered surface pattern information of the objects (the tablets) and specifying identification information of the identification target object (tablet). Details of the object identification apparatus 10 are explained below.

Figure 2:
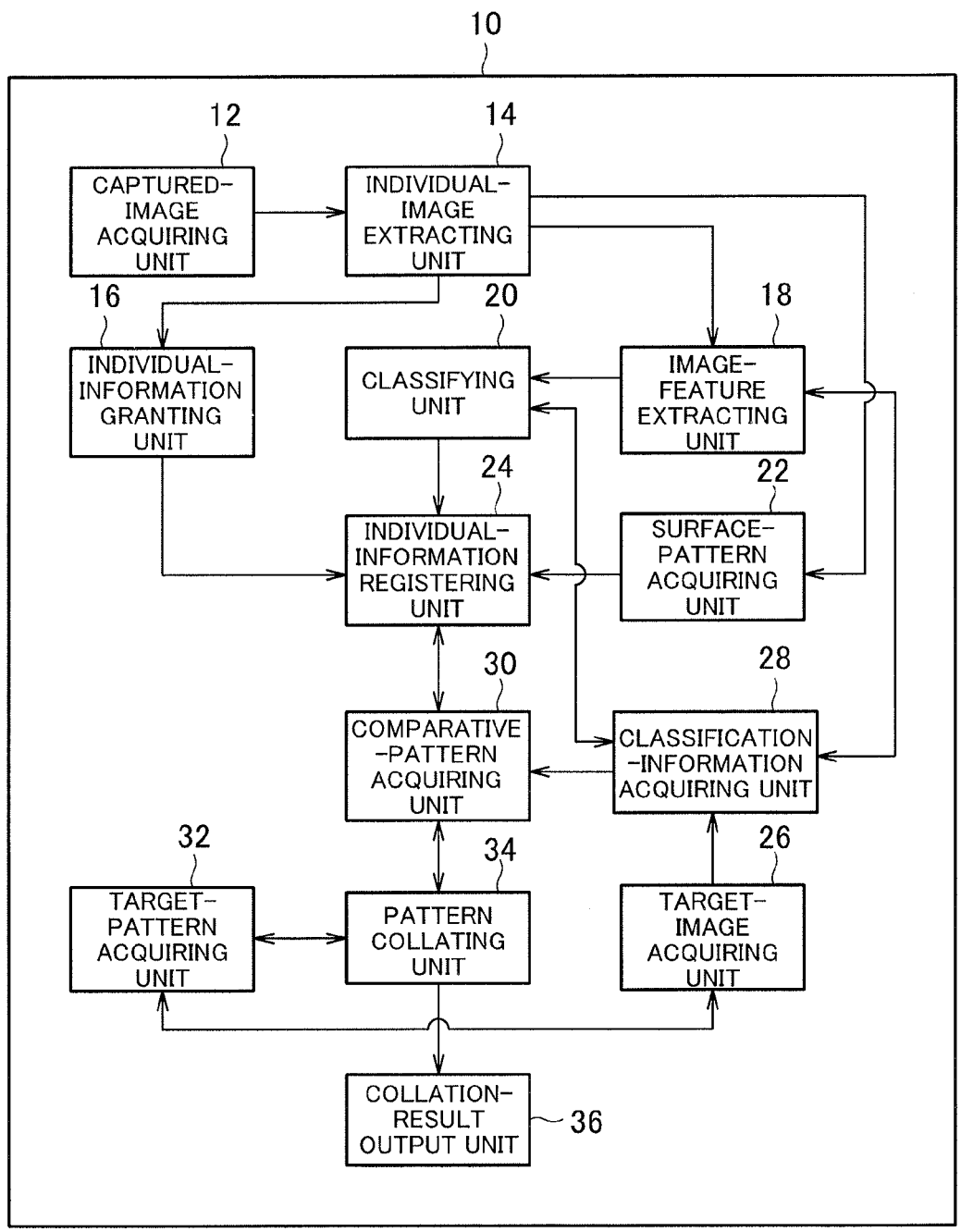
FIG. 2 is a functional block diagram of an object identification apparatus.

In FIG. 2, a functional block diagram of the object identification apparatus 10 is shown. As shown in FIG. 2, the object identification apparatus 10 includes a captured image acquiring unit 12, an individual-image extracting unit 14, an individual-information granting unit 16, an image-feature extracting unit 18, a classifying unit 20, a surface-pattern acquiring unit 22, an individual-information registering unit 24, a target-image acquiring unit 26, a classification-information acquiring unit 28, a comparative-pattern acquiring unit 30, a target-pattern acquiring unit 32, a pattern collating unit 34, and a collation-result output unit 36.

Functions of the units included in the object identification apparatus 10 may be realized by a computer, which includes control unit such as a CPU, storing unit such as a memory, and input/output unit for transmitting and receiving data to and from an external device, reading and executing a program stored in a computer-readable information storage medium. Note that the program may be supplied to the object identification apparatus 10, which is the computer, by an information storage medium such as an optical disk, a magnetic disk, a magnetic tape, a magneto-optical disk, or a flash memory or may be supplied via a data communication network such as the Internet.

The captured image acquiring unit 12 acquires the captured image of the object (the tablet) from the image capture apparatus 4. For example, the image capture apparatus 4 and the object identification apparatus 10 may be connected via wired or wireless network. The captured image acquiring unit 12 may receive the captured image transmitted from the image capture apparatus 4 via the network.

Figure 3:
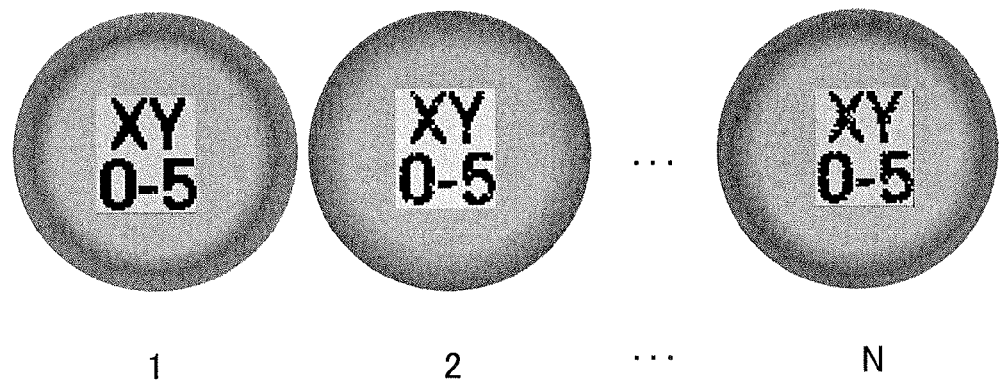
FIG. 3 is a diagram showing an example of a captured image.

In FIG. 3, an example of the captured image acquired by the captured image acquiring unit 12 is shown. In the manufacturing line 5 for tablets according to this exemplary embodiment, N tablets are arranged perpendicularly to a conveying direction. In the captured image shown in FIG. 3, images of the N tablets captured by the image capture apparatus 4 are included. Naturally, a form of the captured image is not limited to the above-mentioned example. Tablets may be subjected to image capture one by one or N×M (M is an integer equal to or larger than 2) tablets may be collectively subjected to image capture.

The individual-image extracting unit 14 extracts an image area (an individual image) corresponding to each of the objects (the tablets) included in the captured image acquired by the captured image acquiring unit 12. For example, the individual-image extracting unit 14 may detect an edge included in the captured image and extract an image area corresponding to one object (tablet) on the basis of the detected edge.

The individual-information granting unit 16 grants information such as identification information (a tablet ID) to individual images corresponding to the objects extracted by the individual-image extracting unit 14. For example, the individual-information granting unit 16 may generate a tablet ID according to a combination of identification information (a manufacturing line ID) of a manufacturing line, a row (perpendicular to the conveying direction) number (any one of 1 to N) on the manufacturing line, a column (the conveying direction) number on the manufacturing line, and manufacturing date and time. When the tablet ID is generated in the above-mentioned form, it is seen from the tablet ID on which date a tablet is manufactured, on which manufacturing line the tablet is manufactured, and in which position on the manufacturing line the tablet is manufactured. In the tablet ID, information such as a container ID for identifying a container in which the tablet is stored may be included. Such information may be stored in association with the tablet ID.

The image-feature extracting unit 18 extracts image features of each of the objects on the basis of a printed image formed on an object surface included in the individual image of each of the objects extracted by the individual-image extracting unit 14. Two examples of the image features used in this exemplary embodiment are explained below.

Concerning a first image feature, focusing on randomness of a positional relation between an object (a tablet) and a printed image formed on the object (the tablet), the positional relation is set as an image feature. For example, as the first image feature, a positional deviation vector indicating a deviation of a center-of-gravity position of the printed image with respect to a reference position of the object (the tablet) (e.g., a center position of the object) may be used.

Figure 4:
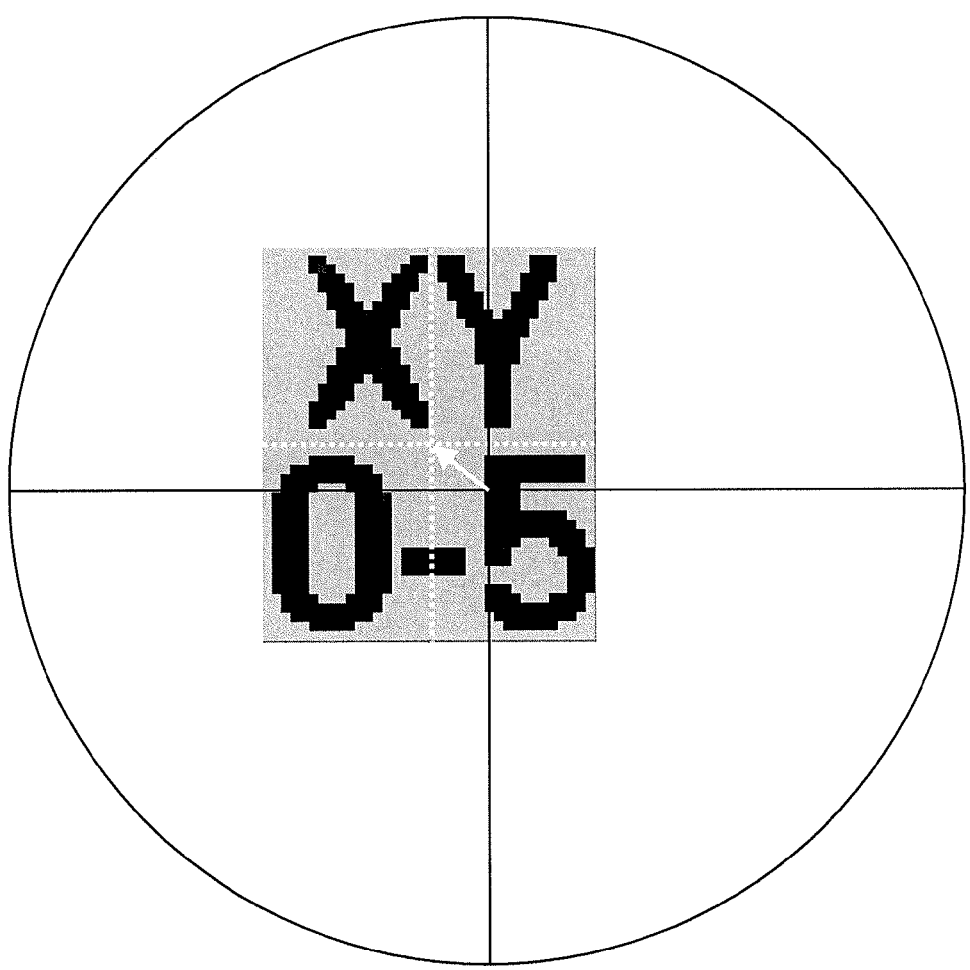
FIG. 4 is a diagram for explaining a specific example of a positional deviation vector.

In FIG. 4, a diagram for explaining a specific example of the positional deviation vector is shown. As shown in FIG. 4, the image-feature extracting unit 18 sets the center of a circumscribed circle (or a circumscribed rectangle) of the individual image as a reference position (a coordinate center (0, 0)) of the object. Further, the image-feature extracting unit 18 binarizes the individual image, extracts the printed image formed on the object, specifies a center-of-gravity position of the circumscribed rectangle of the extracted printed image, and obtains a positional deviation vector starting in the reference position and ending in the center-of-gravity position.

Next, a second image feature is explained. Concerning the second image feature, focusing on randomness of noise included in a printed image formed on an object (a tablet), a pattern of a binarized printed image is set as an image feature.

In FIG. 5, a diagram for explaining a specific example of a binarized printed image pattern is shown. The printed image pattern shown in FIG. 5 is obtained by, for example, extracting an image area having a predetermined size (breadth W, length H) centering on a center-of-gravity position of a circumscribed rectangle of a black pixel group obtained by binarizing an individual image. The size of the image area to be extracted may be determined on the basis of a size of an ideal printed image formed by original data of a printed image. Peculiar noise is included for each of objects in a printed image pattern extracted for each of the objects.

The classifying unit 20 classifies the objects (the tablets) into any one of plural classifications on the basis of at least one of the first image feature and the second image feature extracted for each of the individual images of the object (the tablet) by the image-feature extracting unit 18. An example of classification processing by the classifying unit 20 is explained below.

First, an example (a first example) is explained in which the classifying unit 20 classifies objects on the basis of first image features (positional deviation vectors) extracted from individual images of the objects. In the following explanation, classifications by the first image features are referred to as classifications by a class A.

Figure 6:
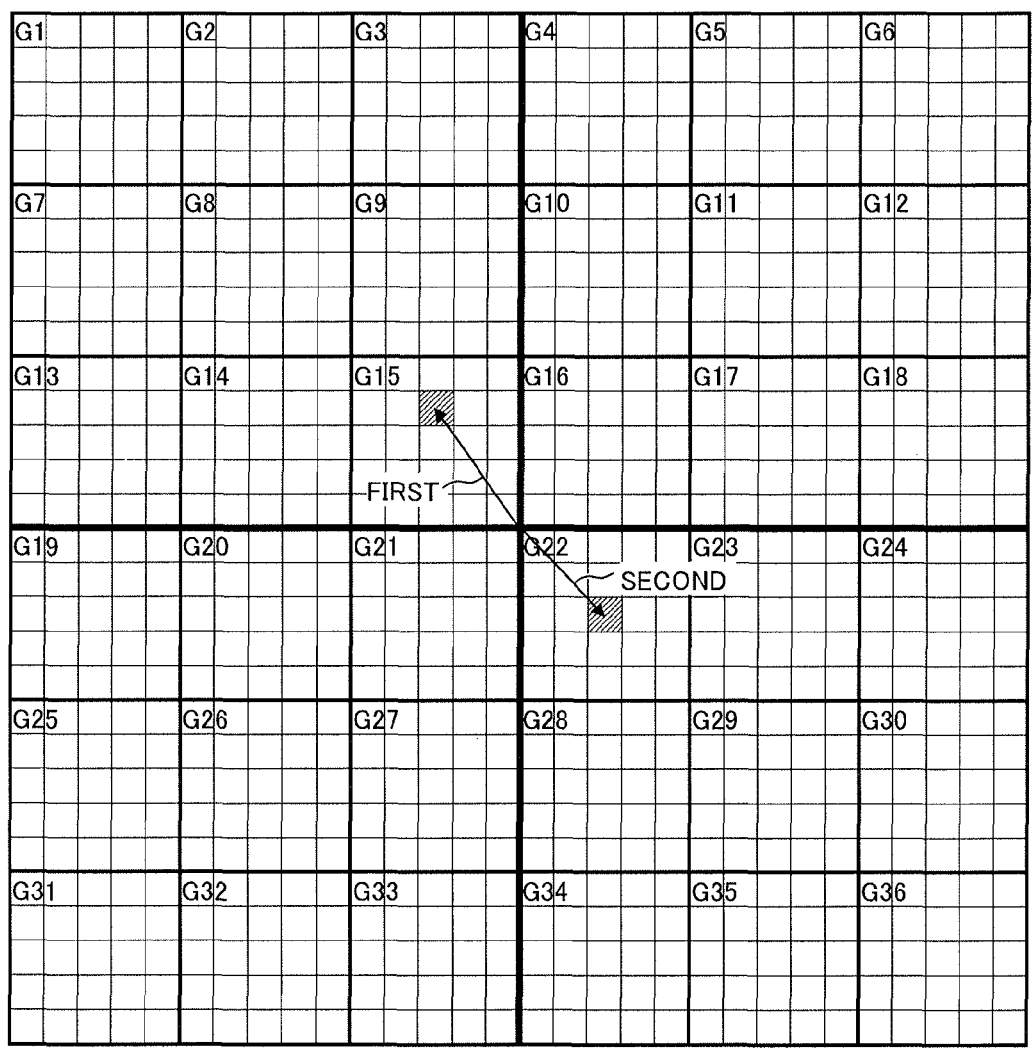
FIG. 6 is a diagram for explaining a specific example of classification processing by a class A.

In FIG. 6, a diagram for explaining a specific example of classification processing by the class A is shown. As shown in FIG. 6, classifications (classifications G1 to Gn (n is an integer equal to or larger than 2)) are set for each of coordinate ranges in a coordinate system having start points of respective positional deviation vectors as origins. Objects corresponding to the positional deviation vectors are classified on the basis of the coordinate ranges to which end points of the positional deviation vectors belong. In the example shown in FIG. 6, the coordinate system is divided into thirty-six coordinate ranges. Classifications are made to correspond to the respective coordinate ranges (G1 to G36). For example, a positional deviation vector related to a first object is classified into G15. A positional deviation vector related to a second object is classified into G22. Note that, although the sizes of the coordinate ranges of the classifications are set equal in the example shown in FIG. 6, the coordinate ranges may be changed according to the distances from the origins. For example, the coordinate ranges may be set larger as the coordinate ranges are farther away from the origins.

In the example shown in FIG. 6, the positional deviation vectors are classified on the basis of the coordinate ranges to which the positional deviation vectors belong. However, the positional deviation vectors may be classified on the basis of the lengths of the positional deviation vectors. Specifically, a range of the lengths of the positional deviation vectors may be set for each of classifications and a classification may be determined according to a range to which the length of the positional deviation vector belongs. When the classification is determined, as the length of the positional deviation vector, a Euclidian distance between a pixel of a start point and a pixel of an end point of the positional deviation vector may be used or a city block distance (a Manhattan distance) may be used.

Next, an example (a second example) is explained in which the classifying unit 20 classifies objects on the basis of second image features (printed image patterns) extracted from individual images of the objects. In the following explanation, classifications by the second image features are referred to as classifications by a class B.

Figure 7:
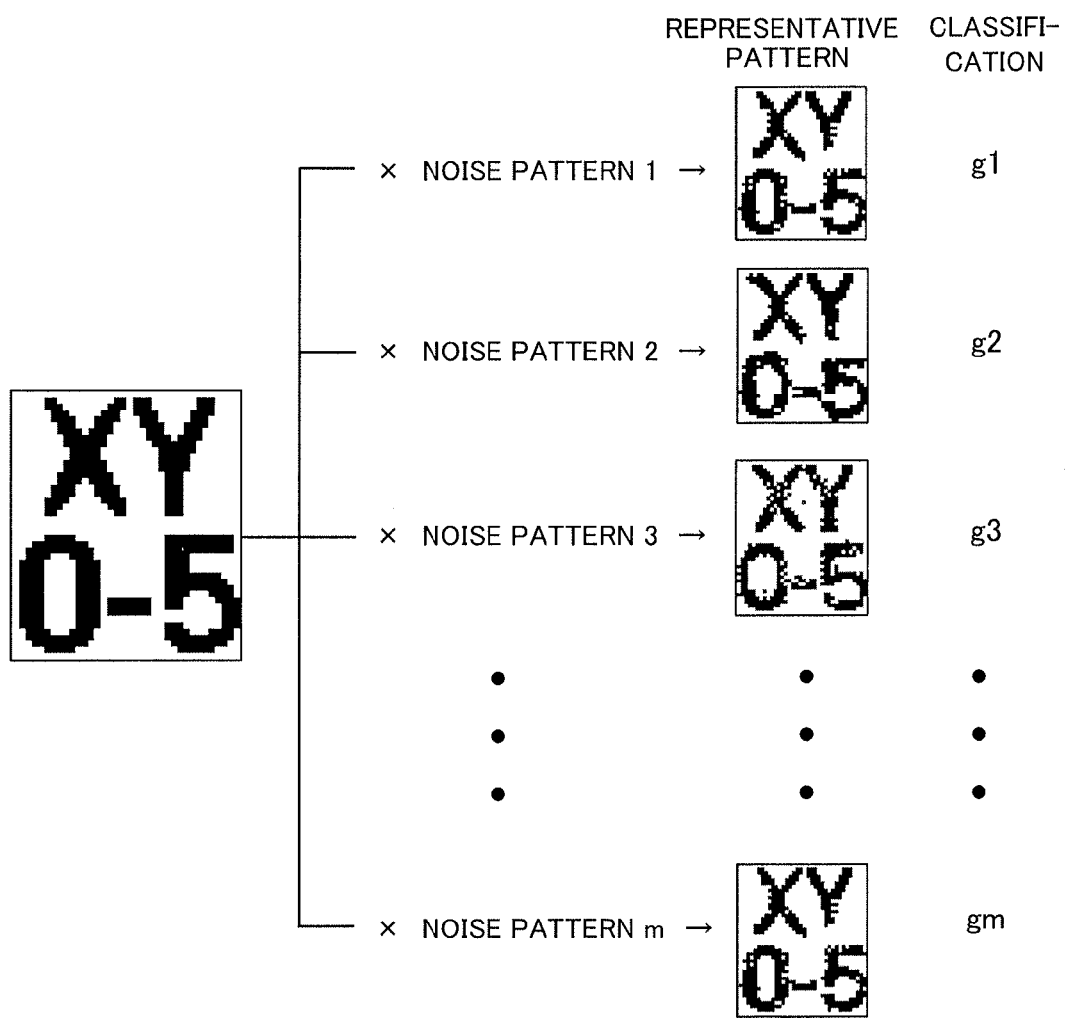
FIG. 7 is a diagram showing an example of a representative pattern generated in advance for each of classifications of a class B.

In FIG. 7, in the second example, an example of a representative pattern generated in advance for each of classifications g1 to gm (m is an integer equal to or larger than 2) of the class B is shown. First, the classifying unit 20 superimposes different random noises 1 to m on data of a printed image, generates first to mth different patterns, and allocates the generated first to mth patterns as representative patterns of the classifications g1 to gm.

Subsequently, the classifying unit 20 calculates each of similarities (distances) between printed image patterns extracted from individual images of objects and the representative patterns of each of the classifications g1 to gm, and determines classifications of the objects as classifications to which the representative patterns most similar to (i.e., having smallest distances to) the printed image patterns belong.

Lastly, an example (a third example) is explained in which the classifying unit 20 classifies objects on the basis of combinations of the first image features (the positional deviation vectors) and the second image features (the printed image patterns) extracted from individual images of the objects.

In the third example, the classifying unit 20 generates 1 to n·m classifications Gij (i=1, . . . , and n, j=1, . . . , and m) according to combinations of the classifications G1 to Gn based on the first example and the classifications g1 to gm based on the second example, determines i on the basis of the first example, and determines j on the basis of the second example.

The surface-pattern acquiring unit 22 acquires image information (surface pattern information) of a predetermined area (pattern sampling area) from individual images of objects extracted by the individual-image extracting unit 14. For example, the pattern sampling area may be set in an image area other than an image area where a printed image is formed in an individual image.

Figure 8:
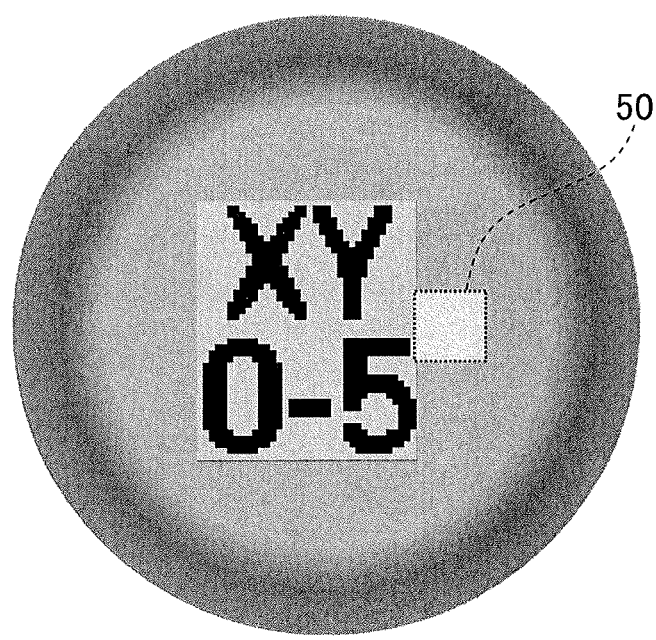
FIG. 8 is a diagram showing an example of a pattern sampling area.

An example of the pattern sampling area is shown in FIG. 8. In the example shown in FIG. 8, in an individual image, an area having a predetermined size (e.g., 32 dots×32 dots) in a position in contact with the right side of a circumscribed rectangle of a printed image is set as a pattern sampling area 50.

The individual-information registering unit 24 registers, concerning an object, identification information granted by the individual-information granting unit 16, classification information determined by the classifying unit 20, and surface pattern information acquired by the surface-pattern acquiring unit 22 in a database in association with one another.

In FIG. 9, an example of a pattern information table registered by the individual-information registering unit 24 is shown. In the pattern information table shown in FIG. 9, object identification information (a tablet ID), classification information (classifications of a class A and classifications of a class B), and surface pattern information are stored in association with one another.

Processing for registering information concerning all objects (tablets) in the database during manufacturing of the objects is as explained above. Next, processing for setting, as a target object, for example, one object (tablet) acquired after manufactured objects (tablets) are distributed and specifying identification information of the target object is explained in detail.

The target-image acquiring unit 26 acquires a captured image obtained by capturing an image of the target object. The target-image acquiring unit 26 may acquire, for example, from the image capture apparatus 4 not shown in the figure, a captured image obtained by capturing an image of the target object with the image capture apparatus 4. Note that, when the acquired captured image of the target object does not stand upright (does not face a predetermined direction), the target-image acquiring unit 26 may execute image processing for rotating the captured image and causing the captured image to stand upright. Specifically, the target-image acquiring unit 26 may rotate the captured image such that the direction of a printed image included in the captured image is set in the predetermined direction.

The image-feature extracting unit 18 extracts image features of the target object on the basis of the printed image formed on the surface of the target object included in the captured image acquired by the target-image acquiring unit 26. Details of extraction processing for image features are the same as the details of the processing explained above. Therefore, explanation of the details of the extraction processing is omitted.

The classification-information acquiring unit 28 acquires candidates of a classification to which the target object belongs on the basis of a result of classification performed by the classifying unit 20 on the basis of the image features of the target object extracted by the image-feature extracting unit 18.

For example, when the first image features (the positional deviation vectors) are used as the image features, a coordinate area to which a positional deviation vector of the target object belongs may be acquired as a classification of a first candidate. Other coordinate areas may be acquired as classifications of a second candidate to a Kth candidate in order from a coordinate closest to the positional deviation vector. The number of candidates K may be set in advance or may be the number of coordinate areas, distances from which to the positional deviation vector are within a threshold.

Figure 10:
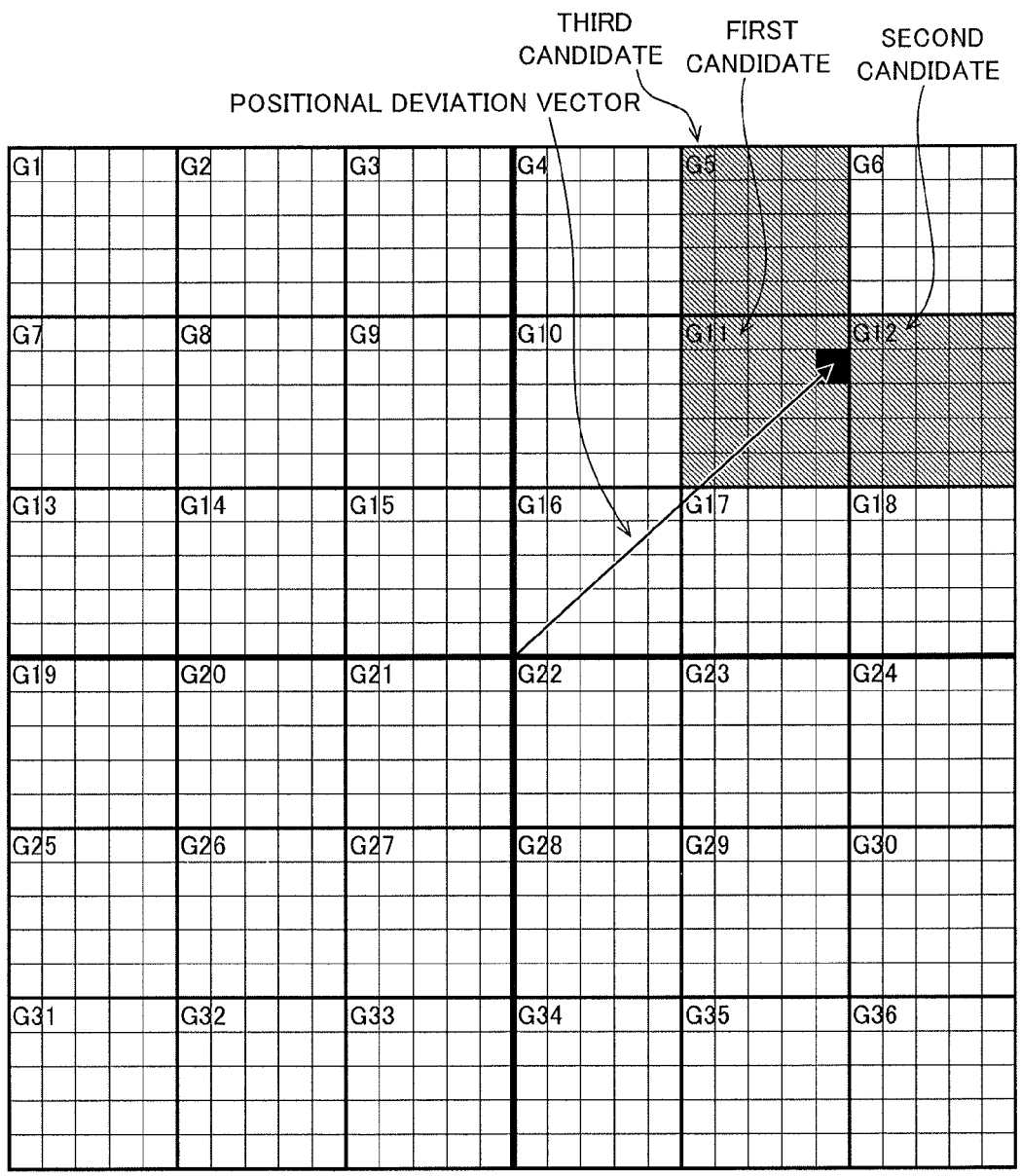
FIG. 10 is a diagram showing an example of classification candidates of the class A.

In FIG. 10, an example of classifications of the class A acquired on the basis of the positional deviation vector of the target image is shown. As shown in FIG. 10, when the positional deviation vector is present in a classification G11, the classification G11 may be set as a first candidate, a classification G12 closest to a boundary with the positional deviation vector may be set as a second candidate, and a classification G5 second closest to the boundary may be set as a third candidate.

When second image features (the printed image patterns) are used as the image features, classifications of the class B of first to Kth candidates may be acquired in order from a candidate, a representative pattern of which is most similar to a printed image pattern. The number of candidates K may be set in advance or may be set as the number of representative patterns, similarities (distances) of which to the printed image pattern are within a threshold.

When the combinations of the first image features (the positional deviation vectors) and the second image features (the printed image patterns) are used as the image features, in the classifications Gij, i may be acquired on the basis of the first image features and j may be acquired on the basis of the second image features.

The comparative-pattern acquiring unit 30 acquires surface pattern information registered by the individual-information registering unit 24 in association with classifications acquired by the classification-information acquiring unit 28. Note that, when candidates of first to Kth classifications are acquired by the classification-information acquiring unit 28, the comparative-pattern acquiring unit 30 may acquire surface pattern information associated in the order of the first to Kth classifications.

The target-pattern acquiring unit 32 acquires surface pattern information of a target object (hereinafter, target surface pattern information) from a captured image of the target object. For example, the target-pattern acquiring unit 32 may acquire image information (surface pattern information) of a predetermined area (target pattern sampling area) from the captured image of the target object. Note that the target pattern sampling area may be an image area including a pattern sampling area. The target pattern sampling area may be set in an area other than an image area where a printed image is formed in an individual image.

The pattern collating unit 34 compares the target surface pattern information acquired by the target-pattern acquiring unit 32 and the respective kinds of surface pattern information acquired by the comparative-pattern acquiring unit 30 and specifies surface pattern information matching target surface pattern information. Specifically, the pattern collating unit 34 compares respective kinds of surface pattern information acquired concerning classifications of an ith (an initial value of i is 1) candidate and the target surface pattern information. When there is no surface pattern information matching the target surface pattern information among the kinds of surface pattern information, the pattern collating unit 34 increments i and repeatedly executes, until surface pattern information matching the target surface pattern information appears or no more matching surface pattern information is present, processing for comparing respective kinds of surface pattern information acquired concerning classifications of a new ith candidate and the target surface pattern information. When surface pattern information matching the target surface pattern information is specified, the pattern collating unit 34 may acquire, from the database, identification information (a tablet ID) registered in association with the specified surface pattern information.

The collation-result output unit 36 outputs a collation result obtained by the pattern collating unit 34. When identification information of an object to be collated with the target object is specified by the pattern collating unit 34, the collation-result output unit 36 may output the identification information by, for example, displaying the identification information on a display or printing the identification information with a printing apparatus. When identification information of an object to be collated with the target object is not specified by the pattern collating unit 34, the collation-result output unit 36 may output to that effect by, for example, displaying to that effect on the display or printing to that effect with the printing apparatus.

Next, flows of processing performed by the object identification apparatus 10 are explained with reference to flowcharts.

First, a flow of processing for registering surface pattern information of registration target objects (tablets) (registration processing) is explained with reference to a flowchart shown in FIG. 11.

Figure 11:
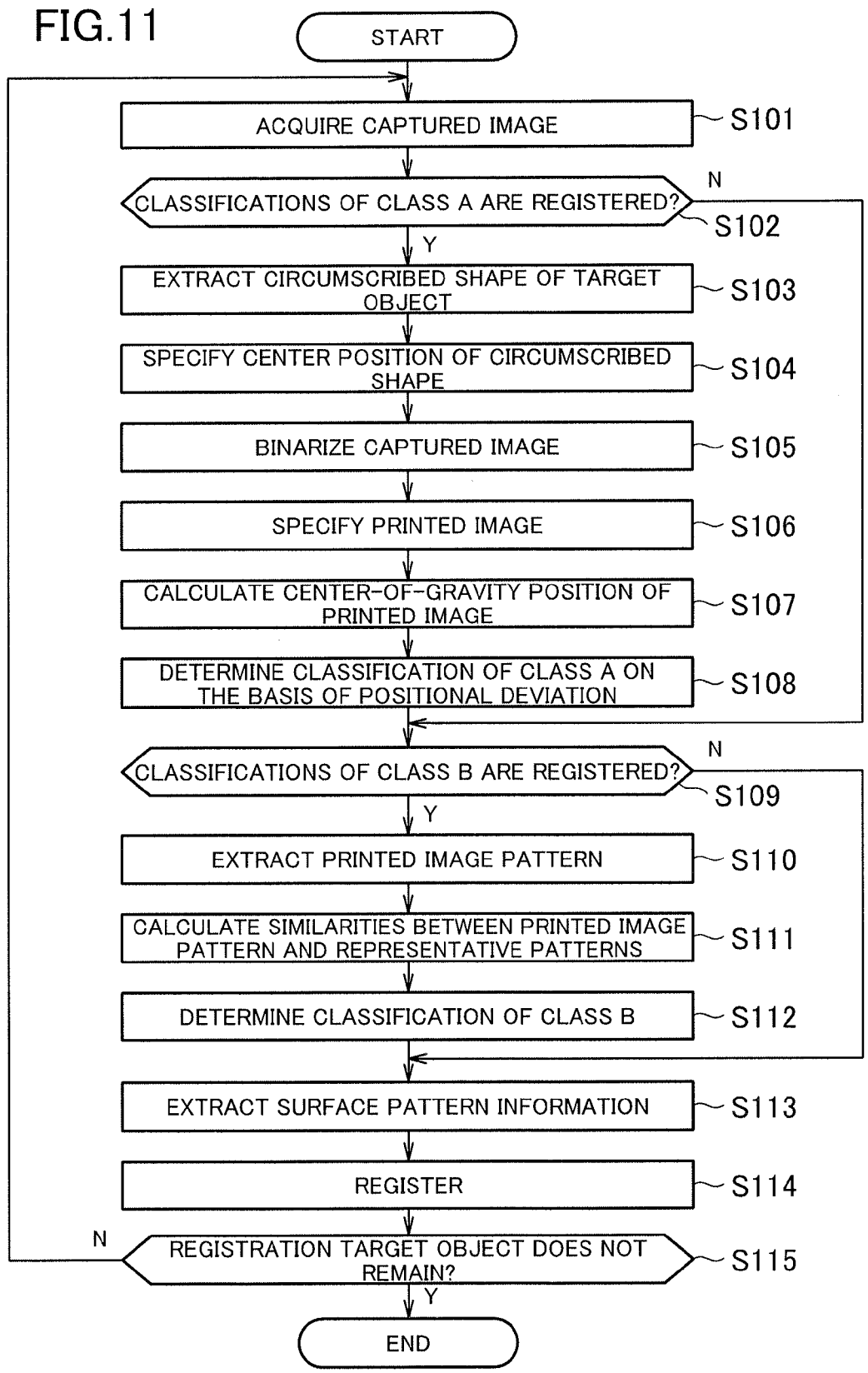
FIG. 11 is an example of a flowchart of registration processing.

As shown in FIG. 11, the object identification apparatus 10 acquires a captured image of a registration identification target object (tablet) (S101). When classifications of the class A are not registered (S102: N), the object identification apparatus 10 proceeds to S109. When classifications of the class A are registered (S102: Y), the object identification apparatus 10 extracts a circumscribed shape of the target object included in the captured image (S103) and specifies a center position of the extracted circumscribed shape (S104).

Subsequently, the object identification apparatus 10 binarizes the captured image (S105), specifies a printed image formed on the object (S106), and calculates a center-of-gravity position of the specified printed image (S107). The object identification apparatus 10 determines, on the basis of a positional deviation between the center position specified in S104 and the center-of-gravity position calculated in S107, a classification related to the class A of the registration identification target object (S108).

Subsequently, when classifications of the class B are not registered (S109: N), the object identification apparatus 10 proceeds to S113. When classifications of the class B are registered (S109: Y), the object identification apparatus 10 extracts, with a center set in a center-of-gravity position of printed image specified by binarizing the captured image, an image area (a printed image pattern) having a predetermined size on the basis of a size of the printed image (S110). The object identification apparatus 10 calculates similarities between an image pattern of the image area extracted in S110 and predetermined representative patterns of classifications related to the class B (S111). The object identification apparatus 10 determines a classification related to the class B of the registration identification target object on the basis of a representative pattern most similar to the image pattern (S112).

The object identification apparatus 10 extracts surface pattern information from an area in a predetermined position and having a predetermined size other than an area in which the printed image is included in the captured image of the registration identification target object (S113). The object identification apparatus 10 registers identification information of the registration identification target object, information concerning the classifications determined in S107 and S109, and the surface pattern information extracted in S113 in the database in association with one another (S114).

When a registration identification target object remains (S115: N), the object identification apparatus 10 returns to S101. When a registration identification target object does not remain (S115: Y), the object identification apparatus 10 ends the registration processing.

Next, a flow of processing for collating a collation identification target object (tablet) with a registered object (collation processing) performed by the object identification apparatus 10 is explained with reference to flowcharts shown in FIGS. 12, 13, and 14A and 14B.

In FIG. 12, a flowchart for explaining a first example of the collation processing is shown. In the flowchart shown in FIG. 12, an example is explained in which the collation processing is performed using classifications of the class A.

As shown in FIG. 12, the object identification apparatus 10 acquires a captured image of a collation identification target object (tablet) (S201). The object identification apparatus 10 extracts the circumscribed shape of a target object included in the captured image (S202) and specifies a center position of the extracted circumscribed shape (S203).

Subsequently, the object identification apparatus 10 binarizes the captured image (S204), specifies a printed image formed on the object (S205), and calculates a center-of-gravity position of the specified printed image (S206). The object identification apparatus 10 determines, on the basis of a positional deviation between the center position specified in S203 and the center-of-gravity position calculated in S206, candidates (first to Nth) of a classification related to the class A concerning the collation identification target object (S207).

The object identification apparatus 10 extracts, from the captured image of the collation identification target object, surface pattern information (target surface pattern information) used for collation from an area in a predetermined position and having a predetermined size other than an area in which the printed image is included (S208).

The object identification apparatus 10 acquires respective kinds of surface pattern information registered in association with classifications related to an ith (an initial value of i is 1) candidate among the candidates determined in S207 (S209). The object identification apparatus 10 determines whether surface pattern information matching the target surface pattern information is present among the acquired kinds of surface pattern information (S210). When it is determined that surface pattern information matching the target surface pattern information is absent (S210: N) and when i does not reach N (S211: Y), the object identification apparatus 10 increments i (S212) and returns to S209. When i reaches N in S211 (S211: N), the object identification apparatus 10 determines that an object to be collated is absent (S213) and ends the processing. On the other hand, when it is determined in S210 that matching surface pattern information is present (S210: Y), the object identification apparatus 10 determines, as identification information of the collation identification target object, identification information associated with the matching surface pattern information (S214) and ends the processing.

In FIG. 13, a flowchart for explaining a second example of the collation processing is shown. In the flowchart shown in FIG. 13, an example is explained in which the collation processing is performed using classifications of the class B.

As shown in FIG. 13, the object identification apparatus 10 acquires a captured image of a collation identification target object (tablet) (S301). The object identification apparatus 10 binarizes the captured image (S302), specifies a printed image formed on the object (S303), and calculates a center-of-gravity position of the specified printed image (S304).

Subsequently, the object identification apparatus 10 extracts, with a center set in the center-of-gravity position of the printed image calculated in S304, an image area (a printed image pattern) having a predetermined size on the basis of a size of the printed image (S305). The object identification apparatus 10 calculates similarities between an image pattern of the image area extracted in S305 and predetermined representative patterns of classifications related to the class B (S306). The object identification apparatus 10 determines, on the basis of the order of similar representative patterns, candidates (first to Mth) of a classification related to the class B concerning the collation identification target object (S307).

The object identification apparatus 10 extracts, from the captured image of the collation identification target object, surface pattern information (target surface pattern information) used for collation from an area in a predetermined position and having a predetermined size other than an area in which the printed image is included (S308).

The object identification apparatus 10 acquires respective kinds of surface pattern information registered in association with classifications related to an ith (an initial value of i is 1) candidate among the candidates determined in S307 (S309). The object identification apparatus 10 determines whether surface pattern information matching the target surface pattern information is present among the acquired kinds of surface pattern information (S310). When it is determined that surface pattern information matching the target surface pattern information is absent (S310: N) and when i does not reach M (S311: Y), the object identification apparatus 10 increments i (S312) and returns to S309. When i reaches M in S311 (S311: N), the object identification apparatus 10 determines that an object to be collated is absent (S313) and ends the processing. On the other hand, when it is determined that matching surface pattern information is present (S310: Y), the object identification apparatus 10 determines, as identification information of the collation identification target object, identification information associated with the matching surface pattern information (S314) and ends the processing.

Figure 14A:
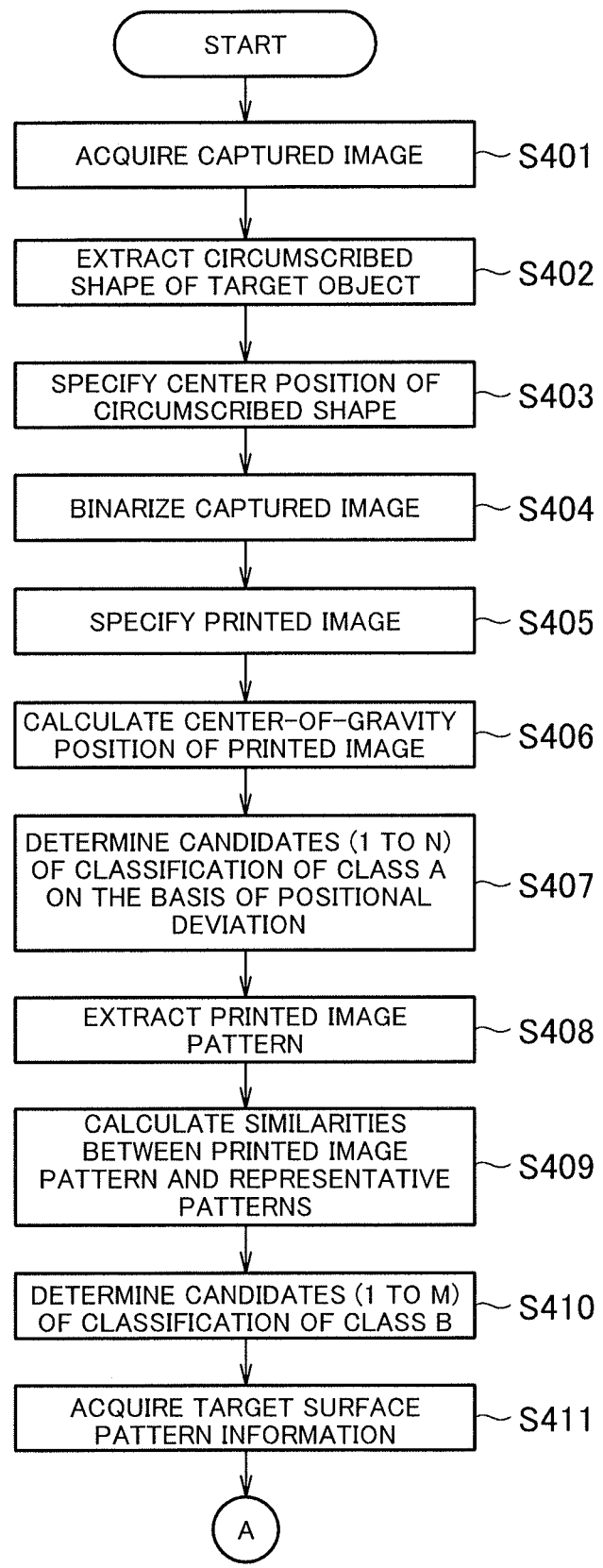
FIG. 14A is an example of a flowchart of collation processing.
Figure 14B:
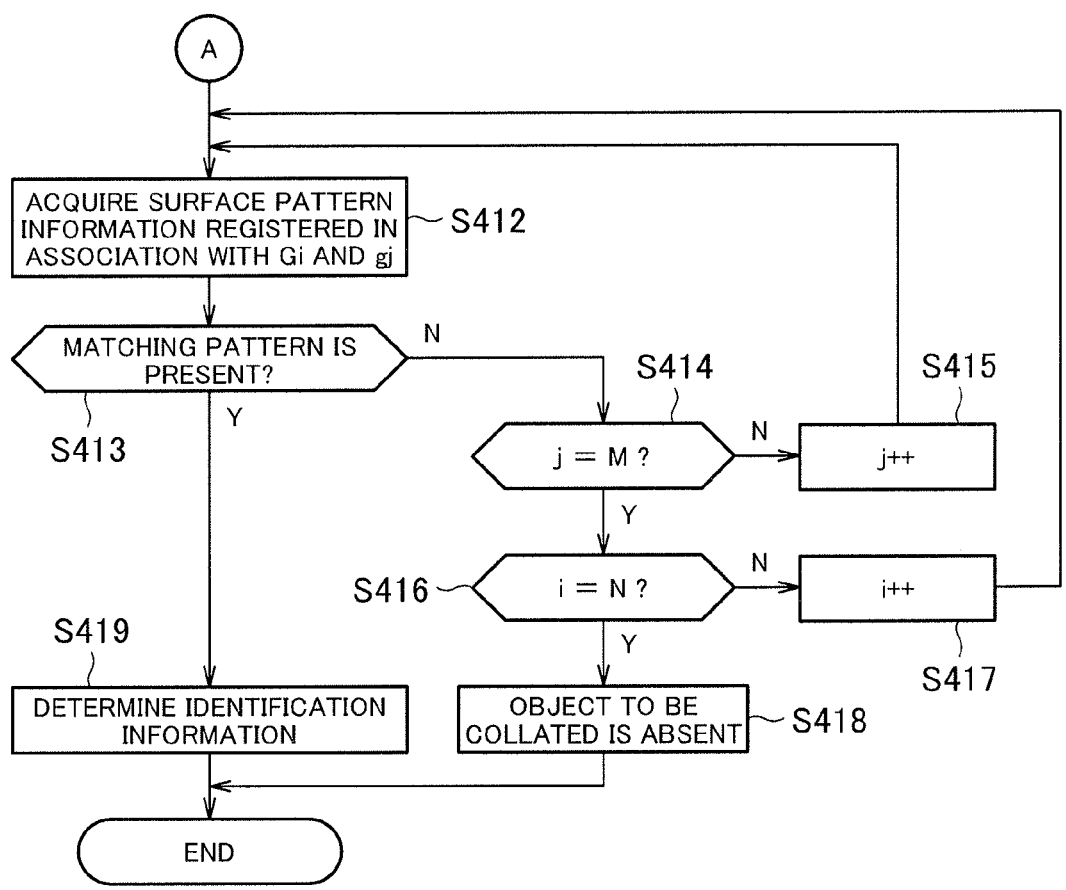
FIG. 14B is an example of the flowchart of collation processing.

A flowchart for explaining a third example of the collation processing is shown in FIGS. 14A and 14B. In the flowchart shown in FIGS. 14A and 14B, an example is explained in which the collation processing is performed using classifications of the class A and the class B.

As shown in FIG. 14A, the object identification apparatus 10 acquires a captured image of a collation identification target object (tablet) (S401). The object identification apparatus 10 extracts a circumscribed shape of the target object included in the captured image (S402) and specifies a center position of the extracted circumscribed shape (S403).

Subsequently, the object identification apparatus 10 binarizes the captured image (S404), specifies a printed image formed on the object (S405), and calculates a center-of-gravity position of the specified printed image (S406). The object identification apparatus 10 determines, on the basis of a positional deviation between the center position specified in S403 and the center-of-gravity position calculated in S406, candidates (first to Nth) of a classification related to the class A concerning the collation identification target object (S407).

Subsequently, the object identification apparatus 10 extracts, with a center set in the center-of-gravity position of the printed image calculated in S406, an image area (a printed image pattern) having a predetermined size on the basis of a size of the printed image (S408). The object identification apparatus 10 calculates similarities between an image pattern of the image area extracted in S408 and predetermined representative patterns of classifications related to the class B (S409). The object identification apparatus 10 determines, on the basis of the order of similar representative patterns, candidates (first to Mth) of a classification related to the class B concerning the collation identification target object (S410).

The object identification apparatus 10 extracts, from the captured image of the collation identification target object, surface pattern information (target surface pattern information) used for collation from an area in a predetermined position and having a predetermined size other than an area in which the printed image is included (S411).

Subsequently, as shown in FIG. 14B, the object identification apparatus 10 acquires respective kinds of surface pattern information registered in association with a classification Gi of the class A related to an ith (an initial value of i is 1) candidate among the candidates determined in S407 and a classification gj of the class B related to a jth (an initial value of j is 1) candidate among the candidates determined in S410

(S412). The object identification apparatus 10 determines whether surface pattern information matching the target surface pattern information is present among the acquired kinds of surface pattern information (S413). When it is determined that surface pattern information matching the target surface pattern information is absent (S413: N) and when j does not reach M (S414: N), the object identification apparatus 10 increments j (S415) and returns to S412.

When i reaches M in S414 (S414: Y) and when i does not reach N (S416: N), the object identification apparatus 10 increments i (S417) and returns to S412. When i reaches N in S416 (S416: Y), the object identification apparatus 10 determines that an object to be collated is absent (S418) and ends the processing.

On the other hand, when it is determined in S413 that matching surface pattern information is present (S413:Y), the object identification apparatus 10 determines, as identification information of the collation identification target object, identification information associated with the matching surface pattern information (S419) and ends the processing.

In the example explained in the flowchart shown in FIGS. 14A and 14B, the collation is performed while sequentially combining the first to Mth candidates with the ith candidate of the class A. However, the collation may be performed while sequentially combining the first to Nth candidates with the jth candidate of the class B or the collation may be performed while sequentially combining the ith candidate of the class A and the jth candidate of the class B in order from the jth candidate of the class A and the jth candidate of the class B having a smallest value of i+j.

In the object identification system 1 explained above, the number of steps of the collation processing is reduced by narrowing down the number of patterns to be collated with surface pattern information of an object making use of image features based on a printed image formed on the surface of the object compared with the number of steps of the collation processing reduced when such narrowing-down of the number of patterns is not performed. Further, when the number of patterns collated with the surface pattern information of the object is narrowed down using both the class A and the class B respectively based on independent image features, the number of steps of the collation processing is further reduced compared with the number of steps reduced when one of the class A and the class B is used.

The invention is not limited to the exemplary embodiment. For example, in the example explained in the exemplary embodiment, the circular tablet is used as the object. However, naturally, the invention may be applied to another object such as an electronic component as long as the object is an object on the surface of which a random pattern and a predetermined image are printed.

In the example explained in the exemplary embodiment, the object identification apparatus 10 executes the registration processing and the collation processing. However, a registration apparatus that executes the registration processing and a collation apparatus that executes the collation processing may be respectively separately configured. In this case, the registration apparatus may include the captured image acquiring unit 12, the individual-image extracting unit 14, the individual-information granting unit 16, the image-feature extracting unit 18, the classifying unit 20, the surface-pattern acquiring unit 22, and the individual-information registering unit 24. The collation apparatus may include the target-image acquiring unit 26, the classification-information acquiring unit 28, the comparative-pattern acquiring unit 30, the target-pattern acquiring unit 32, the pattern collating unit 34, and the collation-result output unit 36.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An object identification system comprising:
at least one memory;
at least one processor configured to implement:
an acquiring unit that acquires a captured image of each of a plurality of objects respectively having peculiar patterns on surfaces thereof, predetermined images being formed on the surfaces;
a classifying unit that classifies, for each of the plurality of objects, the object into one of a plurality of classifications according to a deviation of a position where the predetermined image is formed with respect to a reference position of the object or a pattern of noise included in the predetermined image formed on the object in the captured image acquired by the acquiring unit concerning the object;
a registering unit that registers, in the at least one memory, for each of the plurality of objects, identification information of the object, a pattern image indicating the pattern on the surface of the object, and a classification of the object in association with one another;
a classification acquiring unit that acquires candidates of classifications, from anion the plurality of classifications, for a target object, which is one of the plurality of objects, on the basis of a result obtained by the classifying unit classifying the target object on the basis of a target object captured image obtained by capturing an image of the target object;
a pattern-image acquiring unit that acquires, from the at least one memory, pattern images registered by the registering unit in association with the candidates of classifications acquired by the classification acquiring unit; and
a specifying unit that specifies, as identification information of the target object, identification information associated with a pattern image matching the target object captured image from among the pattern images acquired by the pattern-image acquiring unit.

2. The object identification system according to claim 1, wherein
the classification acquiring unit acquires the candidates of classifications for the target object together with priority levels set in an ascending order of a distance between a deviation of a position where the predetermined image is formed with respect to a reference position of the target object and a region of each of the plurality of classifications in the target object captured image, and
the specifying unit performs collation with the target object captured image in order from a pattern image registered in association with a candidate of a classification with a high priority level among the candidates of classifications for the target object.

3. The object identification system according to claim 1, wherein
the classification acquiring unit acquires the candidates of classifications for the target object together with priority levels set in a descending order of a similarity between a pattern of noise included in the predetermined image formed on the object and a representative pattern of each of the plurality of classifications in the target object captured image, and
the specifying unit performs collation with the target object captured image in order from a pattern image registered in association with a candidate of a classification with a high priority level among the candidates of classifications for the target object.

4. The object identification system according to claim 1, wherein the classifying unit classifies, for each of the plurality of objects, on the basis of the captured image acquired by the acquiring unit concerning the object, the object into one of the plurality of classifications according to a combination of a deviation of a position where the predetermined image is formed with respect to a reference position of the object and a pattern of noise included in the predetermined image formed on the object.

5. The object identification system according to claim 4, wherein
the plurality of classifications comprise combinations of a plurality of first classifications concerning the deviation of the position and a plurality of second classifications concerning the pattern of noise,
the classification acquiring unit acquires first to Nth (N is an integer equal to or larger than 2) candidates concerning the first classifications in an ascending order of a distance between a deviation of the position where the predetermined image is formed with respect to the reference position of the target object and a region of each of the plurality of first classifications in the target object captured image, acquires first to Mth (M is an integer equal to or larger than 2) candidates concerning the second classifications in a descending order of a similarity between a pattern of noise included in the predetermined image formed on the target object and a representative pattern of each of the second classifications in the target object captured image, and acquires the candidates of classifications for the target object together with priority levels set in order of sequential combinations of the first to Mth candidates concerning the second classifications with the respective first to Nth candidates of the first classifications, order of sequential combinations of the first to Nth candidates concerning the first classifications with the respective first to Mth candidates concerning the second classifications, or an ascending order of a sum of i and j concerning an ith (i is an integer of any one of 1 to N) candidate concerning the first classifications and a jth (j is an integer of any one of 1 to M) candidate concerning the second classifications, and
the specifying unit performs collation with the target object captured image in order from the pattern image registered in association with a candidate of a classification having a highest priority level among the candidates of classifications for the target object.

6. A non-transitory computer readable medium storing a program causing a computer to execute a process for identifying an object, the process comprising:
acquiring, by at least one processor, a captured image of each of a plurality of objects respectively having peculiar patterns on surfaces thereof, predetermined images being formed on the surfaces;
classifying, by the at least one processor, for each of the plurality of objects, the object into any one of a plurality of classifications according to a deviation of a position where the predetermined image is formed with respect to a reference position of the object or a pattern of noise included in the predetermined image formed on the object in the captured image acquired concerning the object;
registering, by the at least one processor, in at least one memory, for each of the plurality of objects, identification information of the object, a pattern image indicating the pattern on the surface of the object, and a classification of the object in association with one another;
acquiring, by the at least one processor, candidates of classifications, from among the plurality of classifications, for a target object, which is one of the plurality of objects, on the basis of a result obtained by classifying the target object on the basis of a target object captured image obtained by capturing an image of the target object;
acquiring, by the at least one processor, from the at least one memory, registered pattern images registered in association with the acquired candidates of classifications; and
specifying, by the at least one processor, as identification information of the target object, identification information associated with a pattern image matching the target object captured image from among the acquired pattern images.

7. A collation apparatus comprising:
at least one memory;
at least one processor configured to implement:
a classifying unit that classifies, for each of a plurality of objects respectively having peculiar patterns on surfaces thereof, predetermined images being formed on the surfaces, the object into one of a plurality of classifications according to a deviation of a position where the predetermined image is formed with respect to a reference position of the object or a pattern of noise included in the predetermined image formed on the object in a captured image acquired concerning the object;
a classification acquiring unit that acquires candidates of classifications, from among the plurality f classifications, for a target object, which is one of the plurality of objects, on the basis of a result obtained by the classifying unit classifying the target object on the basis of a target object captured image obtained by capturing an image of the target object;
a pattern-image acquiring unit that acquires pattern images stored in association with the candidates of classifications acquired by the classification acquiring unit from the at least one memory having stored therein, for each of the plurality of objects, identification information of the object, a pattern image indicating a pattern on a surface of the object, and the classification of the object classified by the classifying unit in association with one another; and
a specifying unit that specifies, as identification information of the target object, identification information associated with a pattern image matching the target object captured image from among the pattern images acquired by the pattern-image acquiring unit.

* * * * *